No. 626,950. Patented June 13, 1899.
C. S. WHEELWRIGHT.
AGITATING APPARATUS.
(Application filed Dec. 13, 1897.)
(No Model.)
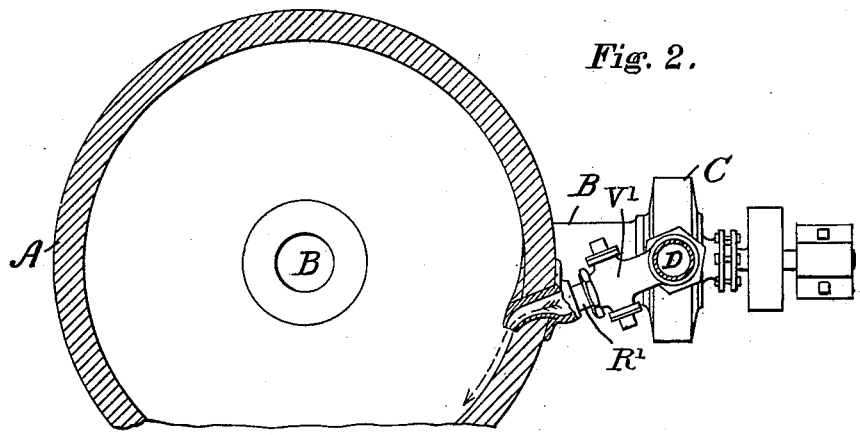
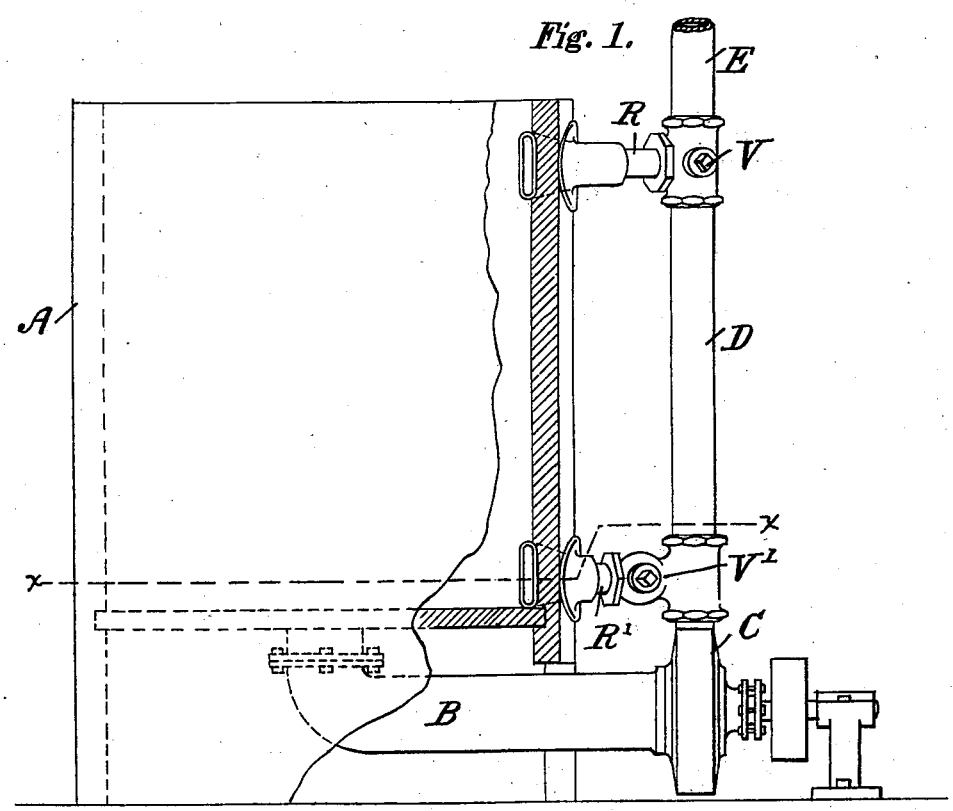
Attest,
Joseph A. Gately
Inventor,
Charles S. Wheelwright

UNITED STATES PATENT OFFICE.

CHARLES S. WHEELWRIGHT, OF PROVIDENCE, RHODE ISLAND.

AGITATING APPARATUS.

SPECIFICATION forming part of Letters Patent No. 626,950, dated June 13, 1899.

Application filed December 13, 1897. Serial No. 661,660. (No model.)

*To all whom it may concern:*

Be it known that I, CHARLES S. WHEELWRIGHT, of Providence, Rhode Island, have invented an Improved Agitating Apparatus for Securing a Uniform Admixture of Particles of Solid Matter with Liquids, of which the following is a specification.

The invention may be used for securing the admixture of any finely-divided material with liquid, but is especially applicable for mixing sulfate of lime, starch, clay, &c., with water in the preparation of fillings for paper. It has reference to that class of agitating apparatus in which finely-divided material in liquid is subjected to a continuous circulation, as well as to continuous agitation; and it has for its object the prevention of the settling, and in some instances the setting, of the finely-divided material in the dead-space between the mouth of the discharge-pipe and the circular wall of the tank.

In carrying out the invention I make use of a circular tank with a flat bottom and a centrifugal or similar continuously-acting discharge-pump connected with the tank at top and bottom, respectively, by return and suction pipes in a well-known manner; but I add thereto a second return-pipe from the pump, entering the tank at the side, near the bottom, on a curve corresponding to the circular shape of the tank. Thus, while the finely-divided material held in the liquid finds no dead-space in which to settle, there is substantially no interference with the vertical motion of the liquid due to the circular shape of the tank and the suction at the bottom. As shown, the return-pipe at the top enters the tank at the side in the same direction as the return-pipe entering near the bottom; but for the present invention in its broadest feature it is essential only that the upper return-pipe shall not enter in a direction opposing that of the lower return-pipe.

In the drawings, Figure 1 is a side elevation of the improved apparatus with portions of the wall of the tank broken away; and Fig. 2 is a sectional plan of a part thereof, taken below the line $x$ $x$ of Fig. 1.

A is a circular tank.

B is a suction-pipe leading from the bottom of the tank, substantially at the center, to the pump.

C is a centrifugal or other pump having a continuous discharge.

D is the main discharge-pipe of the pump, and E is the discharge-pipe of the apparatus as a whole.

R is the main return-pipe, branching from pipe D and entering the top of the tank at one side in such direction or on such a curve that the liquid leaving it under the lifting action of the pump will revolve in the same direction as the liquid already in the tank, circling and falling under the suction of the pump. R' is a second return-pipe entering the tank near the bottom on a curve corresponding to the circular shape of the tank.

V is a three-way valve at the junction of pipes D, R, and E to admit or shut off the flow to the tank and to finally discharge contents of the tank.

V' is a valve in return-pipe R' to open and close the same or regulate the force of the liquid admitted to the tank at the bottom through the said return-pipe R'.

Further description of the operation is unnecessary.

I claim—

1. The combination with a circular tank, of a centrifugal or similar continuously-acting pump, connected with said tank at top and bottom respectively by return and suction pipes, and also at the side near the bottom by a second return-pipe entering said tank upon a curve corresponding to the interior curve of said tank at the place of entrance, substantially as described.

2. The combination with a circular tank, of a centrifugal or similar discharge-pump connected with the said tank at the bottom by a suction-pipe, and at the side near top and bottom by return-pipes entering upon curves corresponding to the interior curve of said tank at the place of entrance, substantially as described.

CHARLES S. WHEELWRIGHT.

Attest:
GEO. WILLIS PIERCE,
JOSEPH A. GATELY.